United States Patent [19]

Lederman

[11] Patent Number: 5,492,339
[45] Date of Patent: Feb. 20, 1996

[54] ROTARY SEAL ASSEMBLY

[75] Inventor: Frederick E. Lederman, Sandusky, Ohio

[73] Assignee: General Motors Corporation, Detroit, Mich.

[21] Appl. No.: 245,126

[22] Filed: May 17, 1994

[51] Int. Cl.⁶ ........................................... F16J 15/32
[52] U.S. Cl. ........................ 277/37; 277/38; 277/152
[58] Field of Search .............................. 277/35, 37, 38, 277/39, 40, 81 R, 88, 90, 96, 96.1, 96.2, 152, 95

[56] References Cited

U.S. PATENT DOCUMENTS

| | | | |
|---|---|---|---|
| 4,516,783 | 5/1985 | Mitsue | 277/152 |
| 4,792,243 | 12/1988 | Takeuchi et al. | 277/152 |
| 5,022,569 | 6/1991 | Otto | 277/152 |
| 5,024,364 | 6/1991 | Nash | 277/35 |
| 5,024,449 | 6/1991 | Otto | 277/37 |
| 5,096,207 | 3/1992 | Seeh et al. | 277/48 |
| 5,147,139 | 9/1992 | Lederman | 384/486 |
| 5,201,533 | 4/1993 | Lederman | 277/152 |
| 5,207,436 | 5/1993 | Lederman | 277/38 |

*Primary Examiner*—Daniel G. DePumpo
*Attorney, Agent, or Firm*—Patrick M. Griffin

[57] ABSTRACT

A seal assembly for a vehicle wheel assembly is provided for use between its two relatively rotatable, coaxial parts to seal the inner bearing chamber. The seal assembly includes a pair of nested casings forming an S-shaped recess in cross section defining inner and outer annular C-shaped concavities. Each casing has a peripheral seal extending radially from a peripheral edge and flexing against the inside sealing surface of the opposite casing to form a seal interface along the circular line of contact. Inner and outer annular floating wafer seals are disposed within the recess formed by the two casings and are pressed against the adjacent sealing surface within their respective concavities. The opposite edges of each independent wafer seal form additional seal interfaces making six total. Each wafer seal is self centering within its respective concavity.

3 Claims, 3 Drawing Sheets

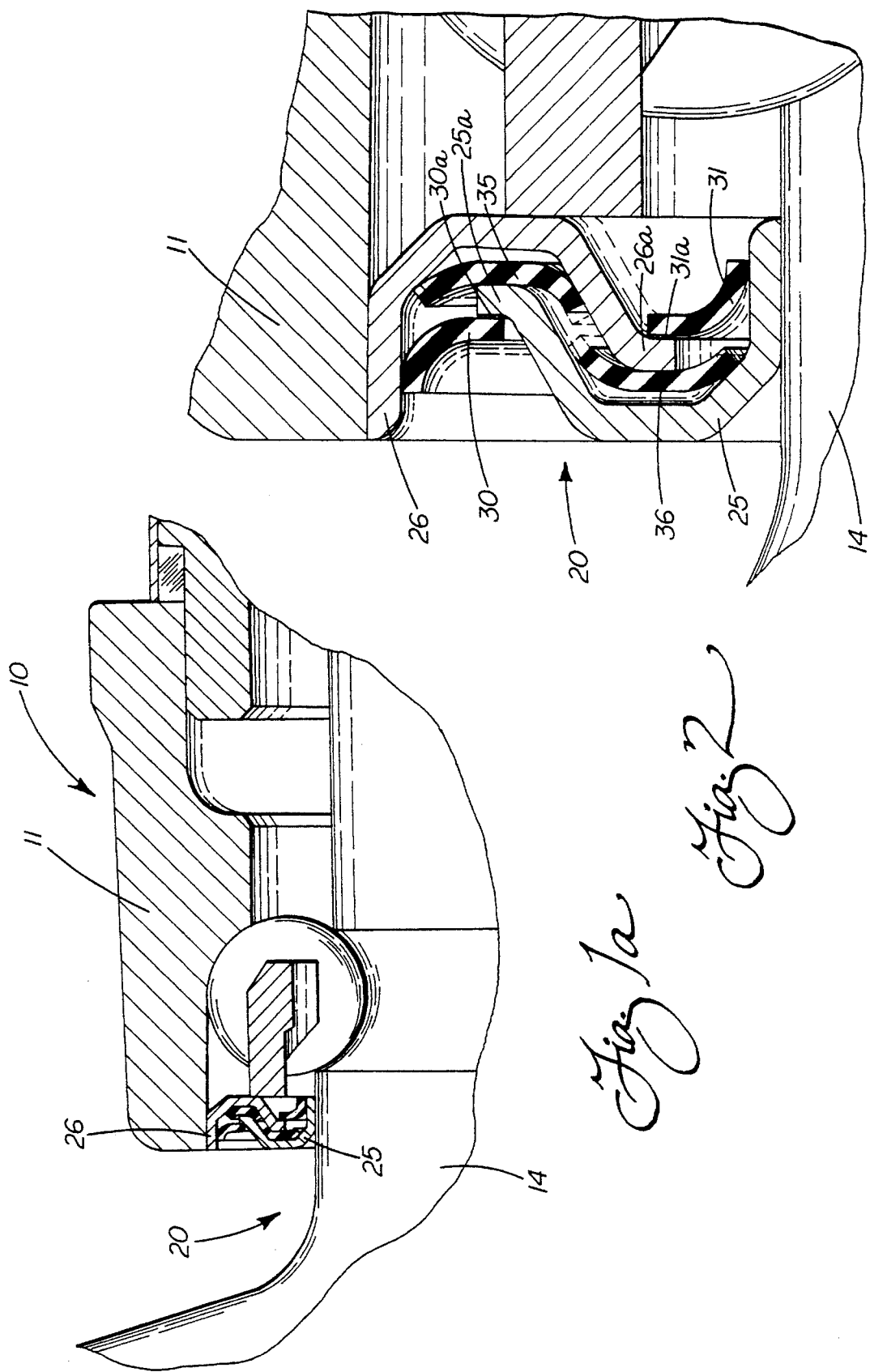

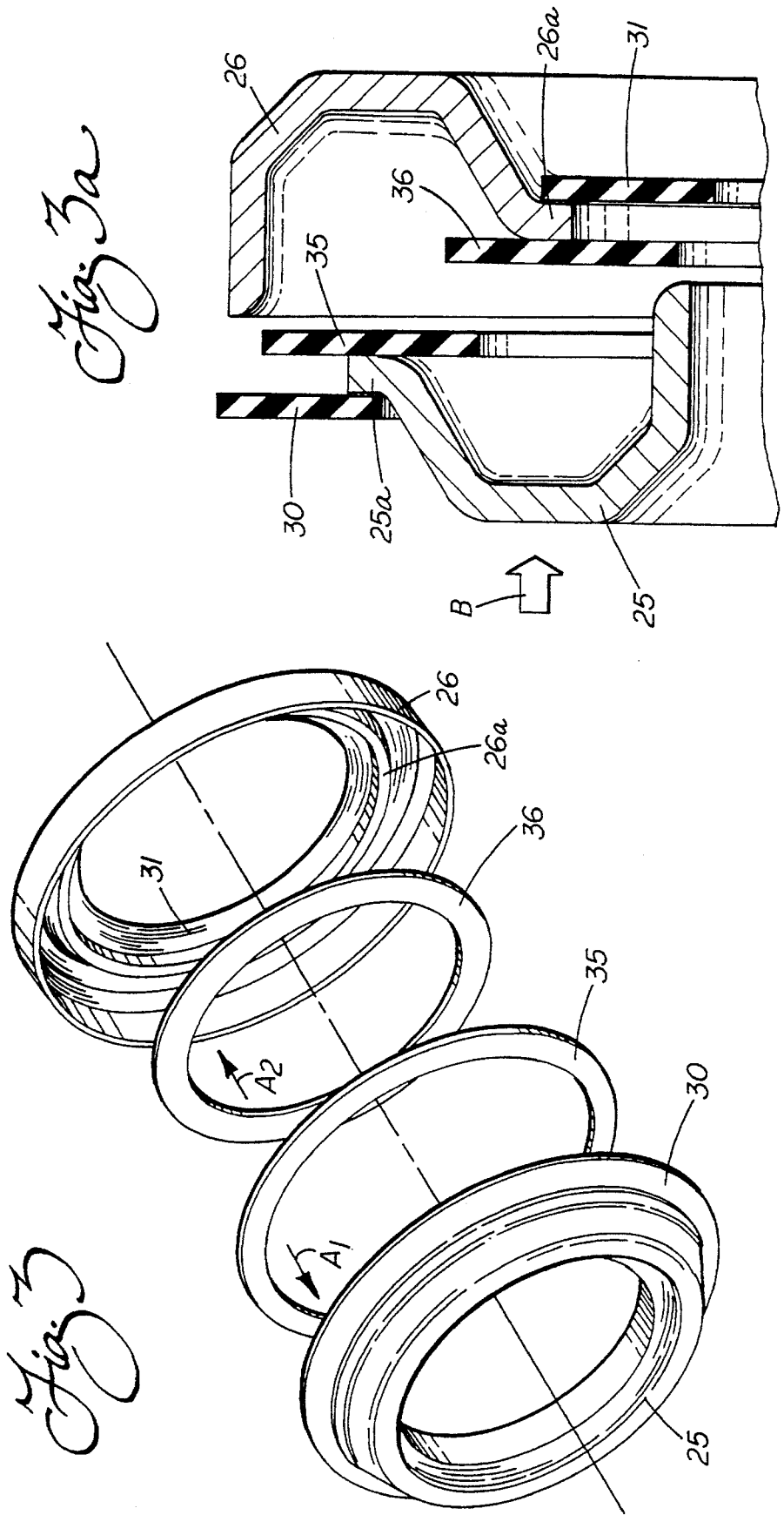

ROTARY SEAL ASSEMBLY

TECHNICAL FIELD

The present invention relates to seal assemblies in general, and more particularly, to a seal assembly forming multiple independent annular sealing interfaces along the circular lines of contact between the multiple seals and the two casings of the assembly.

BACKGROUND OF THE INVENTION

In its simplest form, a seal assembly for a rotary bearing or the like, such as is used for sealing the wheel spindle assembly of a vehicle, includes at least one annular flexible seal member attached to a seal casing, that in turn flexes against the opposed casing to form a sealing interface around the circular line of contact. The seal allows relative rotation between the coaxial, rotating component parts, while maintaining good sealing contact. This seal is primarily to prevent entry of foreign material into the wheel spindle bearing, such as salt, road grime and other debris. The seals of the prior art seal assemblies are primarily formed of a molded elastomer material, such as rubber, but can also be made of less flexible, but lower friction materials, such as polytetrafloroethelene (PTFE).

In the recent prior art, it is common to provide bearing assemblies in the form of a unitized assembly having inner and outer annular casings that support the flexible seal in between. The casings are ring shaped and are formed of stamped metal with sufficient rigidity to be press fit in between the inner and outer coaxial parts supported by the bearing assembly. It is also common in recent seal technology to provide multiple lips on a single seal. Unfortunately, such a double lip seal is rarely twice as effective as a single lip seal because the lips are not functionally independent. This lack of independence of the two sealing components of the seal inherently leads to progressive deterioration over time. For example, vibration in the common hinge of the double lip seal causes accelerated wear on both sealing edges at the two sealing interfaces. Also, corrosion resulting from salt, or other corrosive materials that are commonly encountered in everyday use of a vehicle, can cause accelerated wear of both sealing edges of the double lip seal since typically the edges engage a common land on the opposed casing.

An example of a unitized seal assembly with multiple lips that has had success in use but is subject to the above drawbacks includes the seal assembly shown and described in U.S. Pat. No. 4,597,495, issued Feb. 5, 1985, and owned by the assignee of the present invention. As disclosed in this patent, the single seal is attached to the inner casing and has two lips that engage the inside sealing surface of the outer casing. As such, the lips share a common hinge point and thus are both subject to wear if vibration occurs in the common hinge. Also, in the event the sealing surface of the outer casing starts to corrode, accelerated wear of the sealing edges of the lips is also inevitable. When vibration at the common hinge and corrosion occur together, further accelerated wear of both edges associated with the double lips of this seal occurs, leading evidently to deleterious seal leakage.

Another approach that has had some success in sealing coaxial, rotatable parts, but generally in different, less hostile environments, includes a seal. An example of this type of seal includes U.S. Pat. No. 4,185,838 issued to Danner on Jan. 29, 1980. This patent discloses two separate seals, one attached each to the inner and outer casings of the seal assembly. In this manner, a seal assembly having two, relatively independent seal interfaces and forming a tortuous path in between, is provided. As shown in this patent, a usual prior art approach is to have this type of seal, to be a non-unitized structure with the sealing interfaces formed by elastomer-to-elastomer sliding contact. Even though this seal assembly works well in relatively shielded environments, it still leaves much to be desired in an hostile environment, such as encountered in protecting the bearing assembly of a vehicle wheel spindle assembly.

Especially in the area of wheel spindle technology, a seal assembly can experience rapid, radial vibrations between the inner and outer casings. These vibrations can cause excessive deterioration of the seals along the circular line of contact with the opposing casing. When the seals become worn due to these vibration forces, they inherently lose their ability to flex rapidly enough to maintain the critical continuous sealing contact with the opposing casing. As this occurs, any corrosion along a sealing land of the casing becomes progressive, thus causing more deterioration of the seal edges, and still more loss of sealing contact. Eventually, contamination of the lubricant within this seal assembly can result, thus, of course, resulting in rough bearing operation, along with increased noise and heat.

Thus, the need is identified to provide an improved type seal that is not only characterized by improved seal effectiveness, but also by a longer useful life. Indeed, the present invention discloses such an improvement and a novel solution to the identified problem.

SUMMARY OF THE INVENTION

Accordingly, it is a primary object of the present invention to provide a seal assembly with improved sealing characteristics for use between two relatively rotatable coaxial parts.

Another object of the invention is to provide a seal assembly having improved sealing characteristics gained from an increased number of stable sealing interfaces positioned along a tortuous path within the seal assembly.

Still another object of the invention is to provide an improved seal assembly having a plurality of functionally independent seals providing a plurality of spaced sealing interfaces at an increased number of axially positioned circular lines of contact.

In still another object of the present invention, as set forth above, wherein the series of seals includes both peripheral seals bonded to the respective peripheral portions of the inner and outer annular casings, but also includes at least one annular wafer seal positioned in between the casings so as to float between the casings and to be self centering.

It is still another object of the present invention to provide a seal assembly in accordance with the above object, and wherein there are at least inner and outer floating wafer seals assuring four independent seal members, each having its own separate hinge and providing a total of six sealing interfaces, and thus forming six independent circular line contact barriers.

Still another object of the present invention includes providing a sealing assembly having at least two peripheral seals attached to the peripheral portions of inner and outer annular casings, inner and outer annular wafer seals pressed between the casings adjacent the peripheral portions, and wherein the seal effectiveness is maximized by providing a relatively wide mix of contact angles of the seals with the sealing surfaces of the casings, as well as a division of the primary directions of maximum seal effectiveness.

Additional objects, advantages and other novel features of the invention will be set forth in part in the description that follows, and in part will become apparent to those skilled in the art upon examination of the following description, or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a seal assembly is provided for sealing two relatively rotatable coaxial parts for protection in a relatively hostile environment, such as the bearings for the wheel spindle assembly of a vehicle. More specifically, the seal assembly includes inner and outer annular casings that are oppositely orientated and nested together. The casings form an S-shaped recess in cross-section defining inner and outer C-shaped concavities.

The annular casings are preferably stamped of relatively rigid metal so as to be self supporting when press fitted on their respective coaxial part. Opposite the portion of the casings that are press fitted onto the respective coaxial parts, is a free peripheral portion. From this portion of each casing, a peripheral seal extends radially and is flexed against the inside sealing surface of the opposite annular casing. In this manner, dual, independent seals are provided characterized by independent hinges at the point of attachment to the casings and by firm, stable engagement with the independent sealing surfaces on the opposed casings.

To increase the sealing efficiency further, the two casings preferably are formed with multiple angled, sealing surfaces that form the S-shaped recess. These sealing surfaces in turn form multiple lands where additional circular seal edges can be interposed into the seal assembly. Specifically, the present invention contemplates providing inner and outer annular wafer seals that are pressed into position between the inner and outer C-shaped concavities. The pressing action is provided by the respective free peripheral portions of the casings. For each wafer seal, there is thus provided opposite peripheral edges that contact the adjacent annular sealing surface along a land that is separate from the lands engaged by the peripheral seals. Accordingly, there are two additional annular sealing interfaces in each C-shaped concavity of the seal assembly. The two peripheral seals, coupled with the two wafer seals thus form a total of six sealing interfaces providing the preferred concept of the improved sealing of the present invention.

Since the inner and outer wafer seals are unattached to the casings, these seals float within their respective inner and outer C-shaped concavities. This feature allows the annular wafer seals to be self centering by the counteracting forces that occur at the sealing edges forming the respective sealing interfaces. Preferably, all of the seals are formed of an elastomeric material that is selected for the particular flexibility and wear characteristics that best suit the application of the seal. A suitable elastomeric material for a seal used for protection of a wheel spindle bearing is polytetrafloroethelene (PTFE).

The peripheral seals are attached to the respective peripheral portions of the inner and outer casings by a substantially continuous adhesive ring. Particular advantage is obtained by having the peripheral seals on one side of each casing, and the wafer seals on the opposite. By so positioning the four independent seals, a maximum number of lands on the sealing surfaces of the casings are engaged at a wide mix of contact angles and with the sealing function being primarily equally divided between inner and outer directions along the axis of the coaxial parts.

Still other objects of the present invention will become apparent to those skilled in this art from the following description wherein there is shown and described the preferred embodiments of this invention, simply by way of illustration of two of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1a is a cutaway cross-sectional view that is enlarged for increased detail and showing in particular the seal assembly press fitted between the relatively rotatable vehicle support ring and the wheel spindle;

FIG. 2 is a cross-sectional view, enlarged still further, to show more detail of the seal assembly in position for use;

FIG. 3 is an exploded view of the seal assembly of the present invention illustrating the two casings with the attached peripheral seals and the wafer seals in between; and FIG. 3a is a still further enlarged cross-sectional view, and with the casings/seals separated in a similar exploded view and just prior to being assembled for installation into the wheel spindle assembly.

Figure 1:
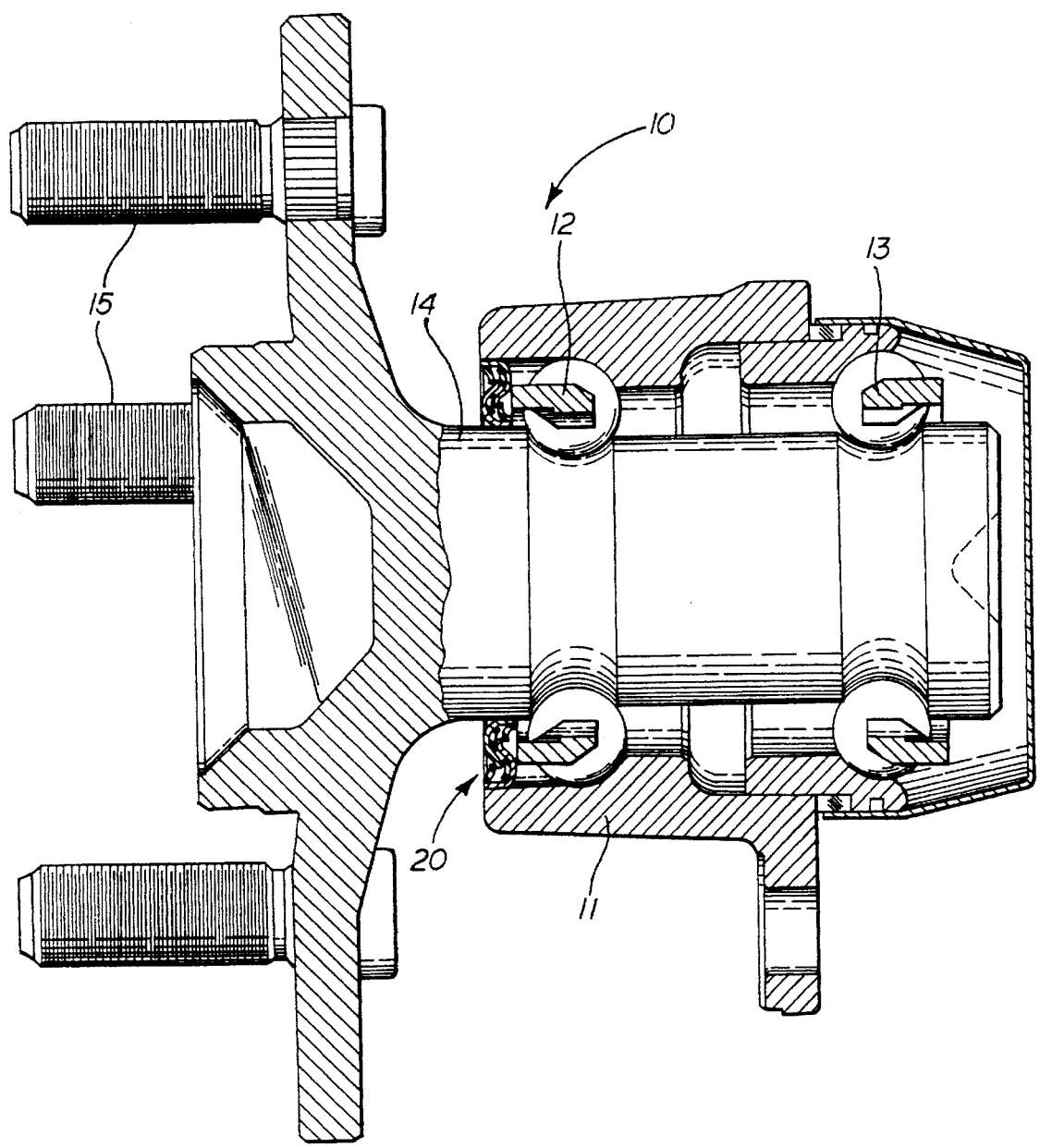
FIG. 1 is a cross-sectional view of a typical wheel spindle bearing assembly including the seal assembly of the preferred embodiment of the present invention.

Reference will now be made in detail to the present preferred embodiment of the invention, an example of which is illustrated in the accompanying drawings.

DETAILED DESCRIPTION OF THE PREFERRED EMBODIMENT

Reference is now made to FIG. 1 of the drawings illustrating a wheel spindle assembly 10 including a support ring 11, typically attached to a portion of a vehicle (not shown). A pair of antifriction bearing 12, 13 provide rotary support for spindle 14. As is well understood in the art, the spindle in turn supports the wheel (not shown) of the vehicle by a plurality of mounting studs 15. A seal assembly, generally designated by the reference numeral 20 and formed in accordance with the principles of the present invention, seals the inside lubricated chamber of the spindle assembly 10. It will be understood by those skilled in the art and in accordance with the present description, that the seal assembly 20 of the present invention is particularly adapted for use in this environment. The seal assembly 10 effectively prevents the entry of salt and other debris into the sealed chamber to protect the bearings 12, 13. On the other hand, it is to be understood that the bearing assembly 20 can be used in other environments to protect other types of bearing assemblies, or any other rotatable coaxial parts.

During normal operation of the wheel spindle assembly 10, relative movement within the bearings 12, 13 creates friction, and in turn, heat. Thus, as is customary, the inside chamber of the wheel bearing assembly 10 is packed with a high grade grease lubricant. Thus, the seal assembly 20, in addition to being effective to prevent the entry of foreign material into the chamber, the seal must be equally effective in preventing the lubricant from leaking toward the outside. Thus, it is desirable to have both inwardly and outwardly directed sealing interfaces in which case the efficiency of the seal assembly is enhanced. As will be apparent from the above and the following description as well, the seal assembly 20 of the present invention accomplishes this result in an unique and superior manner.

The enlarged cutaway, cross-sectional view of FIG. 1a provides a clear insight into these details of the seal assembly 20. Thus, in this view, an inner annular casing 25 is clearly shown, and as indicated above is preferably force fitted onto the wheel spindle 14. Similarly, a complimentary outer annular casing 26 is force fitted into the inside of the support ring 11. In general, it can now be seen that the casings 25, 26 form an S-shape cross-section, thus defining a tortuous path that contributes to the improved performance of the seal assembly 20 of the present invention.

By reference now to FIG. 2, with the increased scale of this illustration, still more detail can be viewed and understood. The S-shaped outline of nested inner and outer casings 25, 26, forms an S-shaped recess, in turn defining inner and outer C-shaped concavities. Within the concavities are multiple, angled lands that serve as independent and separate sealing surfaces for the seals of the present invention. The multiple lands are advantageous since corrosion that might occur on one of the outermost lands of the outer casing 26 is less likely to be able to progress to the inner lands along the tortuous path toward the inside of the sealed chamber. The tortuous path, in and of itself, provides increased sealing capability especially when the effect of centrifugal force of the relative rotating parts is taken into account. Also, each seal in the provides an effective backup to each of the other seals, as well as offering the advantage of providing primary sealing function in both the inward and outer directions.

In the preferred embodiment, each of the annular casings 25, 26, includes a free peripheral portion 25a, 26a opposite the respective portions that are press fitted into position on the rotatable coaxial parts, such as the support ring 11 and the spindle 14. As best shown in this FIG. 2, a peripheral seal 30 is attached to the free peripheral portion 25a to form the outermost sealing interface of the seal assembly 20. A second peripheral seal 31 is attached to the peripheral portion 26a to form the innermost protective sealing interface. As is apparent, the sealing interfaces of the peripheral seals 30, 31 are formed against the inside sealing surfaces of the adjacent casings 26, 25, respectively. In this manner, these two first-line seals 30, 31 provide effective circular line contact around the full periphery of the seal assembly 20, and thus a superior contact barrier against the entry of salt or other road debris, as well as a barrier against the exit of lubricant from the internal chamber of the bearing assembly 10.

Preferably, the peripheral seals 30, 31 are attached to their respective peripheral portions 25a, 26a, by a ring of adhesive 30a, and 31a, respectively. In this manner, the seals 30, 31 are capable of being flexed about independent circular hinges, and as a consequence are held firmly in position against the inside sealing surface of the respective casing 26, 25. As will also be noted with this arrangement, the axial circular lines of contact between the edges of the peripheral seals 30, 31 are spaced over a substantial distance. In addition, within the preferred concept of the seal assembly 20, two additional seals are provided with sealing circular edge contact located at still other axial positions; these seals preferably taking the form of wafer seals 35, 36.

As can best be seen by viewing FIG. 2, and in conjunction with the exploded views of FIGS. 3 and 3a, the wafer seals 35, 36 are relatively free with respect to the casings 25, 26, as opposed to being fixed like the peripheral seals 30, 31. That is, each of the wafer seals 35, 36 engage the adjacent free portions 25a, 26a of the respective casings 25, 26. There is only frictional engagement between these components, as opposed to the fixed attachment by the adhesive rings 30a, 31a for the peripheral seals 30, 31.

During assembly, the wafer seal 35 can be simply moved into position against the peripheral portion 25a of the casing 25, as shown by the action arrow $A_1$ in FIG. 3; and similarly the wafer seal 36 can be moved into position against the peripheral portion 26a within the casing 26, as shown by the action arrow $A_2$. When positioned as indicated, the seals are in the relative position shown in FIG. 3a. At this point, the final assembly is provided by movement of the two casings 25, 26 relative to each other, as shown by the final assembly action arrow B in FIG. 3a. In practice, the seal assembly 20 can be preassembled to form a unitized seal, or it can be mounted for use by separately press fitting the casings 25, 26 onto the respective rotatable coaxial parts (see FIG. 1a) and then the two parts brought together while the wafer seals 35, 36 are temporarily held in position, as illustrated in FIG. 3a. Advantageously, once the assembly is made, the wafer seals 35, 36 are self centering due to the geometry of the spaced lands upon which the edges of these seals engage within the C-shaped concavities (refer to FIG. 3a and the dashed line end portions of the seals in FIG. 2).

During operation, each wafer seal 35, 36 as it is pressed into position against the corresponding sealing surfaces of the casings 26, 25, respectively, and as best shown in FIG. 2, advantageously forms two additional peripheral edge seals. In other words, two circular line seal interfaces are formed in each C-shaped concavity of the seal assembly 20. One sealing interface is directed in the outward direction for each wafer seal 35, 36 and one sealing interface is directed inwardly. Thus, within the preferred embodiment of the seal assembly 20, there are two sealing interfaces formed by the two peripheral seals 30, 31 and four total sealing interfaces formed by the two wafer seals 35, 36, providing a total of six sealing interfaces. As a result, a highly effective, novel seal is created. Each of the sealing interfaces operate in concert with each other in a highly effective manner, and specifically as will be described in further detail immediately below.

First, to briefly recap the function of the two peripheral seals, the innermost seal 31 serves as the first circular line contact barrier containing the lubricant within the sealed chamber of the wheel spindle assembly 10; whereas the peripheral seal 30 forms the outermost contact barrier to exclude salt and other debris. While these two seals in and of themselves provide effective sealing, further substantial advantage is obtained. Among the two peripheral seals 31, 30 and the inner and outer wafer seals 36, 35 a wide mix of contact angles with the casings 25, 26, and an equally divided directional orientation of the sealing edges is realized. In more particular detail, the inner peripheral seal 31 attached to the inner annular casing 26 is flexed primarily in radial tension and provides primarily inward sealing action at its sealing interface against the adjacent land of the casing 25. Similarly, the outer peripheral seal 30 attached to the outer annular casing is flexed in primarily radial compression and provides primarily outward sealing action at its sealing interface against the adjacent land of the casing 26. In turn, the wafer seals 36, 35 are flexed in combined tension/compression and provide both inward and outward sealing action at the two spaced sealing interfaces against the angled lands of the respective adjacent casings 25, 26 (see FIGS. 2 and 3a). With this arrangement, there is a maximizing of the sealing function of each of the four seals 30, 31, 35, 36 since not only is each circular sealing edge engaging a different circular sealing land, but each seal is flexing about its own annular hinge around the seal assembly 20.

In summary, the seal assembly of the present invention provides an exceptional advance in the art in terms of seal effectiveness, as well as extended life. The nested casings 25, 26 form a tortuous S-shaped recess with inner and outer annular C-shaped concavities in which there are a total of six sealing interfaces formed. Each sealing interface is formed against a different angled portion of the casings thereby providing independent lands against which the seals are in contact. This arrangement minimizes the deleterious effect of corrosion that might occur, usually starting from the outside of the seal assembly 20 due to salt or other corrosive materials. In addition, the provision of inner and outer floating wafer seals 35, 36 contribute to the overall efficiency of the sealing arrangement. Among the six sealing interfaces, each is positioned at a different axial location, each is provided with independent hinging action and there is a wide mix of contact angles designed into the combination. In total, three sealing interfaces are directed in the outer direction and three are directed in the inward direction, each in turn serving in series as highly effective annular sealing lines and contact barriers.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one or ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A seal assembly for sealing two relatively rotatable coaxial pans comprising;

inner and outer annular casings nested together and forming an S-shaped recess in cross section defining inner and outer C-shaped concavities;

each of said annular casings having a free peripheral portion and a peripheral seal extending radially from said peripheral portion to flex against an inside sealing surface of the opposite annular casing, thereby forming sealing interfaces along circular lines of contact;

at least one annular wafer seal pressed within one of the inner and outer C-shaped concavities by an adjacent peripheral portion, the wafer seal having opposite peripheral edges that contact the adjacent sealing surface within said one concavity, thereby forming two additional sealing interfaces in said one concavity;

whereby the two peripheral seals and said one wafer seal form a total of four sealing interfaces providing the sealing.

2. A seal assembly as in claim 1, wherein it is further provided;

that both inner and outer annular wafer seals in said inner and outer concavities are unattached to said casings so as to float within said C-shaped concavities;

whereby said annular wafer seals are self centered by counteracting forces at the respective sealing interfaces and with the peripheral seals forming a total of six sealing interfaces providing the sealing.

3. A seal assembly for sealing two relatively rotatable coaxial parts comprising;

inner and outer annular casings nested together and forming an S-shaped recess in cross section defining inner and outer C-shaped concavities;

each of said annular casings having a free peripheral portion and a peripheral seal extending radially from said peripheral portion to flex against an inside sealing surface of the opposite annular casing, thereby forming sealing interfaces along circular lines of contact;

said peripheral seals being attached to the respective peripheral portion by a substantially continuous adhesive ring;

inner and outer annular wafer seals pressed within respective said inner and outer C-shaped concavities by an adjacent peripheral portion, each wafer seal having opposite peripheral edges that contact the adjacent sealing surface within said one respective concavity, thereby forming two additional sealing interfaces in each concavity;

said wafer seals engaging the respective peripheral portion on a side of the casing opposite said adhesive ring;

whereby the two peripheral seals and two wafer seals form a total of six sealing interfaces providing the sealing on both sides of said casings.

* * * * *